(12) United States Patent
Xu et al.

(10) Patent No.: US 12,370,652 B2
(45) Date of Patent: Jul. 29, 2025

(54) MATERIAL CARRYING MECHANISM, FEEDING DEVICE AND BATTERY MANUFACTURING APPARATUS

(71) Applicant: CONTEMPORARY AMPEREX TECHNOLOGY (HONG KONG) LIMITED, Hong Kong (CN)

(72) Inventors: Peilin Xu, Ningde (CN); Lei Song, Ningde (CN); Shengyong Wu, Ningde (CN); Zhaokun Liu, Ningde (CN); Zhengyu Sun, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 277 days.

(21) Appl. No.: 18/348,338

(22) Filed: Jul. 6, 2023

(65) Prior Publication Data
US 2024/0181606 A1    Jun. 6, 2024

Related U.S. Application Data

(63) Continuation of application No. PCT/CN2023/084668, filed on Mar. 29, 2023.

(30) Foreign Application Priority Data

Dec. 5, 2022 (CN) .......................... 202223242140.9

(51) Int. Cl.
B25B 11/02 (2006.01)

(52) U.S. Cl.
CPC .................................... *B25B 11/02* (2013.01)

(58) Field of Classification Search
CPC ......... B25B 11/00; B25B 11/02; B65D 19/44; B65D 2519/00815; B65D 2519/00293; Y10T 29/53961; B23Q 3/18; B23Q 3/102
See application file for complete search history.

(56) References Cited

U.S. PATENT DOCUMENTS

| 6,182,371 | B1 * | 2/2001 | Newman | B23Q 9/0042 |
| | | | | 144/144.1 |
| 7,651,079 | B2 * | 1/2010 | Lee | H10K 50/8426 |
| | | | | 269/21 |

(Continued)

FOREIGN PATENT DOCUMENTS

| CN | 109318155 A | 2/2019 |
| CN | 209239887 U | 8/2019 |

(Continued)

OTHER PUBLICATIONS

The World Intellectual Property Organization (WIPO) International Search Report for PCT/CN2023/084668 May 22, 2023 6 pages (including English translation).

(Continued)

*Primary Examiner* — Tyrone V Hall, Jr.
(74) *Attorney, Agent, or Firm* — ANOVA LAW GROUP, PLLC

(57) ABSTRACT

A material carrying mechanism includes a base, a tray and an adjustment assembly. The tray is movably mounted on the base, and the adjustment assembly is mounted on the base. The adjustment assembly includes a first ejection member and a first elastic restoring member. The first ejection member includes a first telescopic portion abutting against the tray. The first telescopic portion can perform a telescopic movement in a first direction to push the tray to move in the first direction. The first elastic restoring member is connected between the base and the tray, so as to provide to the tray a restoring force directed to the first ejection member.

18 Claims, 7 Drawing Sheets

(56) References Cited

U.S. PATENT DOCUMENTS

| | | | |
|---|---|---|---|
| 8,393,605 B2* | 3/2013 | Yang | .......................... B25B 5/12 |
| | | | 269/287 |
| 9,205,523 B2* | 12/2015 | Yang | ........................ B23Q 3/18 |
| 9,839,981 B2* | 12/2017 | Zhang | .................. B23Q 17/006 |
| 2014/0167343 A1 | 6/2014 | Lu | |

FOREIGN PATENT DOCUMENTS

| | | |
|---|---|---|
| CN | 213495396 U | 6/2021 |
| CN | 113979160 A | 1/2022 |
| CN | 218706901 U | 3/2023 |
| DE | 102018118344 A1 | 1/2020 |
| JP | 2013023267 A | 2/2013 |

OTHER PUBLICATIONS

The European Patent Office (EPO) The Extended European Search Report for 23731082.6 Jul. 10, 2024 5 Pages.

\* cited by examiner

MATERIAL CARRYING MECHANISM, FEEDING DEVICE AND BATTERY MANUFACTURING APPARATUS

CROSS-REFERENCE TO RELATED APPLICATION

The present application is a continuation of International Application No. PCT/CN2023/084668, filed on Mar. 29, 2023, which claims priority to Chinese patent application No. 202223242140.9, filed on Dec. 5, 2022 and entitled "MATERIAL CARRYING MECHANISM, FEEDING DEVICE AND BATTERY MANUFACTURING APPARATUS", which are incorporated herein by reference in their entirety.

TECHNICAL FIELD

The present application relates to the technical field of position adjustment apparatuses, and more specifically to a material carrying mechanism, a feeding device and a battery manufacturing apparatus.

BACKGROUND ART

In a battery manufacturing process, a material carrying mechanism is needed to store a material such as an insulating membrane and an electrode sheet, to facilitate a pick-up mechanism to pick up the material. Since the pick-up mechanism has a fixed picking position, a storage position of the material needs to be adjusted, such that the storage position of the material matches the picking position of the pick-up mechanism. However, the operation method for adjusting the position of the material by the conventional material carrying mechanism is cumbersome and very inconvenient to use.

SUMMARY

An objective of embodiments of the present application is to provide a material carrying mechanism, a feeding device and a battery manufacturing apparatus, in order to solve the technical problem of inconvenient use caused by the cumbersome operation method for adjusting the position of a material by the material carrying mechanism in the related art.

In order to achieve the above objective, a technical solution adopted in the embodiments of the present application is to provide a material carrying mechanism, including:
  a base;
  a tray configured to support a material, the tray being movably mounted on the base; and
  an adjustment assembly mounted on the base, the adjustment assembly including a first ejection member and a first elastic restoring member, wherein the first ejection member includes a first telescopic portion abutting against the tray, the first telescopic portion is capable of performing a telescopic movement in a first direction to push the tray to move in the first direction, and the first elastic restoring member is connected between the base and the tray, so as to provide to the tray a restoring force directed to the first ejection member.

The material carrying mechanism provided in the embodiments of the present application has at least the following beneficial effects. In the material carrying mechanism provided in the embodiments of the present application, by abutting the first telescopic portion of the first ejection member against the tray, and by connecting the first elastic restoring member between the base and the tray, so as to provide to the tray a restoring force directed to the first ejection member, when the first telescopic portion is extended, the first telescopic portion pushes the tray to move in the first direction; when the first telescopic portion is retracted, the tray can move with the first telescopic portion under the action of the restoring force provided by the first elastic restoring member, so that the position of the tray can be adjusted simply by an operator controlling the extended length of the first telescopic portion, so as to realize the adjustment of the storage position of the material, saving time and effort in operation, and effectively improving the operation convenience of the material carrying mechanism.

In some embodiments of the present application, the material carrying mechanism further includes a first fastener, the tray is provided with a threaded hole, and the first fastener is threaded connected in the threaded hole and passes through the threaded hole so as to abut against the base.

With the above technical solution, when the tray is moved to a predetermined position, it is possible to lock the tray on the base simply by the operator tightening the first fastener until the first fastener abuts against the base, thereby further improving the operation convenience of the material carrying mechanism.

In some embodiments of the present application, the first ejection member further includes a first threaded sleeve, an outer periphery of the first telescopic portion has a first external thread, and the first threaded sleeve is threadedly connected to the first external thread of the first telescopic portion.

With the above technical solution, when the first telescopic portion is screwed, it is possible for the first telescopic portion to perform a telescopic movement in the first direction under the action of threads, so as to push the tray to move in the first direction.

In some embodiments of the present application, the first ejection member further includes a first pressure cylinder, the first telescopic portion is a pneumatic rod, and the first telescopic portion is slidably connected in the first pressure cylinder.

With the above technical solution, when an internal pressure value of the first pressure cylinder is changed, it is possible for the first telescopic portion to perform a telescopic movement in the first direction under the action of pressure, so as to push the tray to move in the first direction.

In some embodiments of the present application, the first ejection member is provided with a first scale portion configured to indicate an extended length of the first telescopic portion.

With the above technical solution, it is possible for the operator to control the extended length of the first telescopic portion by observing the scale value of the first scale portion, so as to control a position adjustment amount of the tray, thereby effectively improving the position adjustment accuracy of the material by the material carrying mechanism.

In some embodiments of the present application, the adjustment assembly further includes a first guide rod arranged between the base and the tray, the first guide rod extends in the first direction, the first elastic restoring member is a spring, and the first elastic restoring member is sleeved on the first guide rod.

With the above technical solution, it is possible to prevent the first elastic restoring member from leaving the position between the base and the tray, thereby effectively improving the operating reliability of the adjustment assembly; and it is also possible to ensure that the first elastic restoring member can stably perform a telescopic movement between the base and the tray, thereby effectively improving the operating stability of the adjustment assembly.

In some embodiments of the present application, the adjustment assembly further includes a second ejection member and a second elastic restoring member, wherein the second ejection member includes a second telescopic portion abutting against the tray, the second telescopic portion is capable of performing a telescopic movement in a second direction to push the tray to move in the second direction, and the second elastic restoring member is connected between the base and the tray, so as to provide to the tray a restoring force directed to the second ejection member, the second direction being not parallel to the first direction.

With the above technical solution, it is possible to adjust the position of the tray in the first direction and in the second direction, thereby effectively increasing the range of position adjustment of the material by the material carrying mechanism.

In some embodiments of the present application, the second ejection member further includes a second threaded sleeve, an outer periphery of the second telescopic portion has a second external thread, and the second threaded sleeve is threadedly connected to the second external thread of the second telescopic portion.

With the above technical solution, when the second telescopic portion is screwed, it is possible for the second telescopic portion to perform a telescopic movement in the second direction under the action of threads, so as to push the tray to move in the second direction.

In some embodiments of the present application, the second ejection member further includes a second pressure cylinder, the second telescopic portion is a pneumatic rod, and the second telescopic portion is slidably connected in the second pressure cylinder.

With the above technical solution, when an internal pressure value of the second pressure cylinder is changed, it is possible for the second telescopic portion to perform a telescopic movement in the second direction under the action of pressure, so as to push the tray to move in the second direction.

In some embodiments of the present application, the second ejection member is provided with a second scale portion configured to indicate an extended length of the second telescopic portion.

With the above technical solution, it is possible for the operator to control the extended length of the second telescopic portion by observing the scale value of the second scale portion, so as to control a position adjustment amount of the tray, thereby effectively improving the position adjustment accuracy of the material by the material carrying mechanism.

In some embodiments of the present application, the adjustment assembly further includes a second guide rod arranged between the base and the tray, the second guide rod extends in the second direction, the second elastic restoring member is a spring, and the second elastic restoring member is sleeved on the second guide rod.

With the above technical solution, it is possible to prevent the second elastic restoring member from leaving the position between the base and the tray, thereby effectively improving the operating reliability of the adjustment assembly; and it is also possible to ensure that the second elastic restoring member can stably perform a telescopic movement between the base and the tray, thereby effectively improving the operating stability of the adjustment assembly.

In some embodiments of the present application, the base has a first surface and a second surface arranged opposite to each other, and the base is provided with a first through hole penetrating the first surface and the second surface; the tray includes a support portion, an adjustment portion and a connecting portion, wherein the support portion is arranged on the first surface and is configured to support the material, the adjustment portion is arranged on the second surface, the connecting portion passes through the first through hole and is connected between the support portion and the adjustment portion, and the connecting portion is movable in the first direction in the first through hole; and the adjustment assembly is mounted on the second surface, and the first telescopic portion abuts against the adjustment portion.

With the technical solution, the structure of the material carrying mechanism is effectively optimized, so as to avoid interference between the adjustment assembly and the material placed on the support portion or other components arranged on the first surface of the base.

In some embodiments of the present application, the support portion includes a first plate body and a second plate body, wherein the first plate body is connected to the connecting portion, the second plate body is configured to support the material, and the second plate body is detachably connected to the first plate body.

With the above technical solution, it is possible for the operator to replace the second plate body according to the size of the material, so that the material carrying mechanism can be applied to materials of different sizes, thereby effectively improving the versatility of the material carrying mechanism.

In some embodiments of the present application, the second plate body has a mounting cavity in which the first plate body is embedded.

With the above technical solution, it is possible to replace the second plate body quickly, thereby further improving the operation convenience of the material carrying mechanism.

In some embodiments of the present application, the support portion is detachably connected to the connecting portion.

With the above technical solution, it is possible for the operator to replace the support portion according to the size of the material, so that the material carrying mechanism can be applied to materials of different sizes, thereby effectively improving the versatility of the material carrying mechanism.

In some embodiments of the present application, the material carrying mechanism further includes a separation assembly, the separation assembly including a mounting seat mounted on the base and a separation member mounted on the mounting seat, the separation member being in contact with an edge of the material.

With the above technical solution, it is possible to separate, during a pick-up process, materials that are attached to each other, so as to avoid the situation that a plurality of materials are picked up in one pick-up operation, so as to ensure that the pick-up operation can be carried out stably, thereby effectively improving the production efficiency.

In some embodiments of the present application, the base is provided with a plurality of positioning holes distributed in sequence from an edge of the tray in a direction away from the tray, and the mounting seat is connected to any one or more of the positioning holes.

With the above technical solution, it is possible for the operator to adjust the position of the mounting seat according to the size of the material, so that the material carrying mechanism can be applied to materials of different sizes, thereby effectively improving the versatility of the material carrying mechanism.

In some embodiments of the present application, the base is provided with a guide portion having an extending direction parallel to a distribution direction of the plurality of positioning holes, and the mounting seat is slidably mounted to the guide portion.

With the above technical solution, it is possible for the operator to move the mounting seat to a predetermined position in the extending direction of the guide portion, facilitating the position adjustment operation of the mounting seat, thereby further improving the operation convenience of the material carrying mechanism.

In some embodiments of the present application, the separation assembly further includes a second fastener, the mounting seat is provided with a strip-shaped hole extending in the distribution direction of the plurality of positioning holes, and the second fastener passes through the strip-shaped hole and is connected in the positioning hole.

With the above technical solution, after the second fastener is connected to the positioning hole, it is possible to fine-tune the position of the mounting seat still in the extending direction of the strip-shaped hole, and then to tighten the second fastener so as to lock the mounting seat on the base, thereby effectively improving the position adjustment accuracy of the mounting seat.

In some embodiments of the present application, the separation member includes a flexible portion which is in contact with the edge of the material.

With the above technical solution, the separation member can be in flexible contact with the material, so as to buffer a contact force between the separation member and the material, thereby preventing the separation member from damaging the material.

In some embodiments of the present application, there are a plurality of separation assemblies distributed at intervals along an outer periphery of the tray.

With the above technical solution, it is possible to ensure that the materials attached to each other are separated during the pick-up process, so as to avoid the situation that a plurality of materials are picked up in one pick-up operation, and more effectively ensure that the pick-up operation can be carried out stably, thereby further improving the production efficiency.

In some embodiments of the present application, the tray is provided with a positioning portion configured to limit the position of the material.

With the above technical solution, it is possible to avoid the displacement of the material, thereby ensuring that the position of the material is adapted to the picking position of the feeding device, and effectively improving the operating reliability of the material carrying mechanism.

The embodiments of the present application also provide a feeding device, including a pick-up mechanism and a material carrying mechanism of any one of the above embodiments, wherein the pick-up mechanism is configured to pick up a material placed on the tray.

Since the feeding device provided in the embodiments of the present application uses the material carrying mechanism of any of the above embodiments, it is possible to adjust the storage position of the material more conveniently such that the storage position of the material is adapted to the picking position of the pick-up mechanism, thereby effectively improving the production efficiency.

The embodiments of the present application also provide a battery manufacturing apparatus, including the feeding device described above.

Since the battery manufacturing apparatus provided in the embodiments of the present application uses the feeding device of any of the above embodiments, it is possible to adjust the storage position of the material more conveniently such that the storage position of the material is adapted to the picking position of the pick-up mechanism, thereby effectively improving the production efficiency.

DESCRIPTION OF DRAWINGS

In order to illustrate the technical solutions in the embodiments of the present application more clearly, the drawings to be used in the description of the embodiments of the present application will be described briefly below. Obviously, the drawings in the following description are merely for some embodiments of the present application. For those of ordinary skill in the art, other drawings can also be obtained according to these drawings without involving any inventive effort.

DESCRIPTION OF REFERENCE NUMERALS

Figure 1:
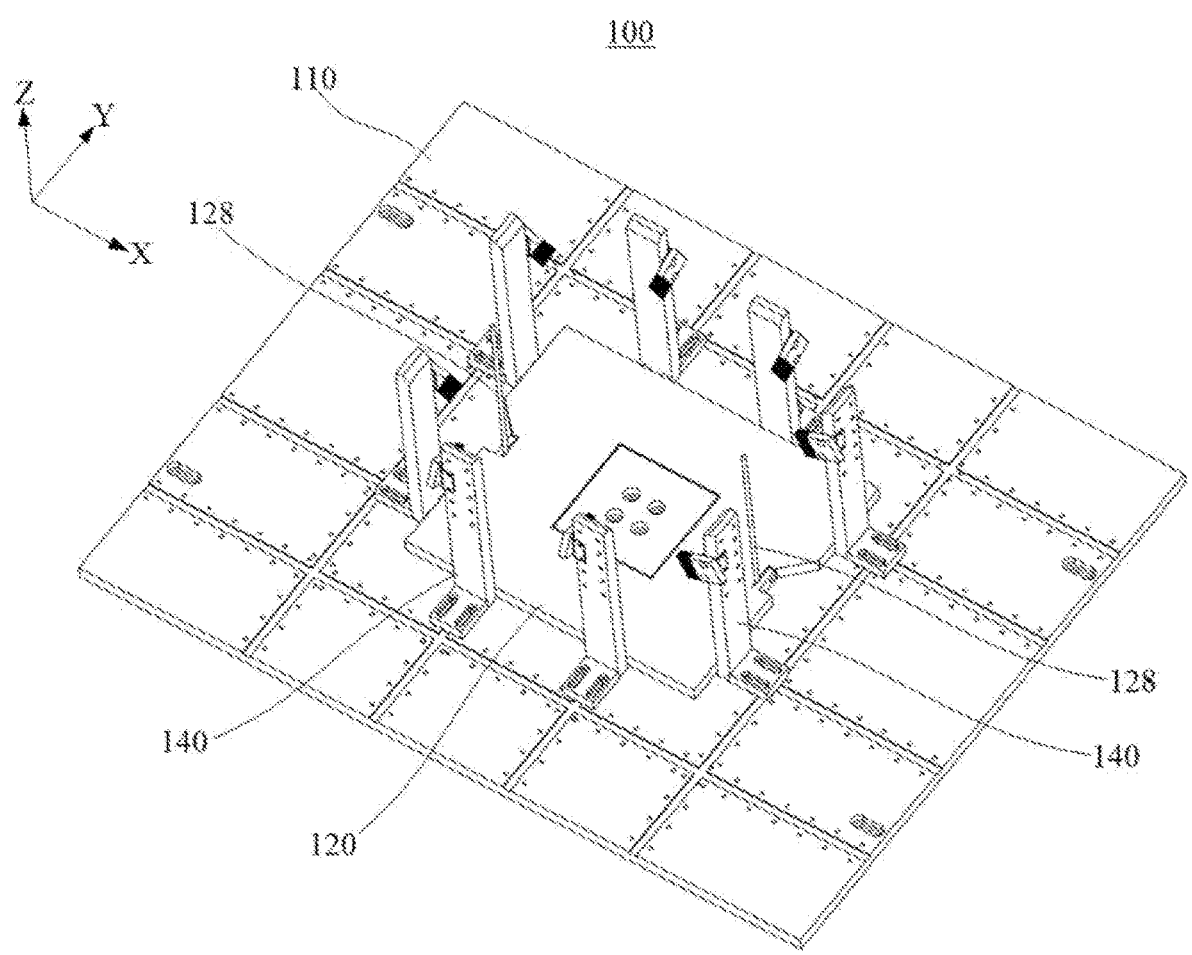
FIG. 1 is a schematic structural diagram of a material carrying mechanism provided in an embodiment of the present application.

100. Material carrying mechanism;
110. Base; 111. First surface; 112. Second surface; 113. First through hole; 114. Positioning hole; 115. Guide portion; 116. First fixing portion; 117. Second pressing portion; 118. Second fixing portion; 119. Fourth pressing portion;
120. Tray; 121. Support portion; 1211. First plate body; 1212. Second plate body; 12121. Mounting cavity; 122. Adjustment portion; 1221. Threaded hole; 123. Connecting portion; 124. First ejection portion; 125. First pressing portion; 126. Second ejection portion; 127. Third pressing portion; 128. Positioning portion;
130. Adjustment assembly; 131. First ejection member; 1311. First telescopic portion; 1312. First threaded sleeve; 1313. First scale portion; 132. First elastic restoring member; 133. First guide rod; 134. Second ejection member; 1341. Second telescopic portion; 1342. Second threaded sleeve; 1343. Second scale portion; 135. Second elastic restoring member;
140. Separation assembly; 141. Mounting seat; 1411. Strip-shaped hole; 142. Separation member; 1421. Flexible portion; 1422. Mounting portion.

DETAILED DESCRIPTION

In order to make the technical problem to be solved by the present application, technical solutions and beneficial effects more clear, the present application will be described in further detail below with reference to the drawings and embodiments. It should be understood that the particular embodiments described herein are only used for illustrating the present application and not intended to limit the present application.

It should be noted that when an element is referred to as being "fixed to" or "arranged on" another element, it may be directly on the other element or be indirectly on the other element. When an element is referred to as being "connected" to another element, it may be directly or indirectly connected to the other element.

It should be understood that the orientations or positional relationships indicated by the terms "length", "width", "up", "down", "front", "rear", "left", "right", "vertical", "horizontal", "top", "bottom", "inside", "outside", etc. are based on the orientations or positional relationships shown in the drawings, and are only for the convenience of describing the present application and simplifying the description, rather than indicating or implying that an apparatus or element referred to must have a specific orientation or be constructed and operated in a specific orientation, and therefore cannot be construed as limiting the present application.

In addition, the terms "first", "second", "third", "fourth" and "fifth" are merely for descriptive purposes and should not be construed as indicating or implying relative importance or implicitly indicating the number of technical features indicated. Thus, the features defined with "first", "second", "third", "fourth" and "fifth" may explicitly or implicitly include one or more features. In the description of the present application, the meaning of "a plurality of" is two or more, unless otherwise explicitly and specifically defined.

In a battery manufacturing process, a material carrying mechanism is needed to store a material such as an insulating membrane and an electrode sheet, to facilitate a pick-up mechanism to pick up the material. Since the pick-up mechanism has a fixed picking position, a storage position of the material needs to be adjusted, such that the storage position of the material matches the picking position of the pick-up mechanism. It can be understood that a battery may be a battery cell, that is, the smallest electric energy storage unit formed by winding or stacking a positive electrode sheet, a negative electrode sheet and a separator; or may be a battery module, that is, an electric energy storage device formed by connecting and arranging a plurality of battery cells in series, parallel or series-parallel connection; or may be a battery pack, that is, an electric energy storage device formed by connecting and arranging a plurality of battery cells or a plurality of battery modules in series, parallel or series-parallel connection.

At present, the material carrying mechanism generally includes a base and a tray. The tray is a component configured to support a material. The tray is movably mounted on the base. The storage position of the material can be adjusted simply by adjusting the position of the tray. At present, the position adjustment method of the material mainly relies on manually pushing the tray. If the tray moves beyond a predetermined position after the first push of the tray, the tray needs to be pushed in the opposite direction, and the operation is repeated until the tray reaches the predetermined position to complete the position adjustment operation of the material. The operation is time-consuming and laborious, and is very inconvenient.

In order to improve the operation convenience of the material carrying mechanism, the embodiments of the present application provide a material carrying mechanism, in which a first telescopic portion of a first ejection member abuts against a tray, and a first elastic restoring member is connected between a base and the tray, so as to provide to the tray a restoring force directed to the first ejection member, so that when the first telescopic portion is extended, the first telescopic portion pushes the tray to move in a first direction; when the first telescopic portion is retracted, the tray can move with the first telescopic portion under the action of the restoring force provided by the first elastic restoring member, so that the position of the tray can be adjusted simply by an operator controlling the extended length of the first telescopic portion, so as to realize the adjustment of the storage position of the material, saving time and effort in operation, and effectively improving the operation convenience of the material carrying mechanism.

In a first aspect, the embodiments of the present application provide a material carrying mechanism 100, which material carrying mechanism 100 can be applied to an apparatus for manufacturing a battery and is configured to store a battery manufacturing material. The battery may be a battery cell, a battery module, or a battery pack. Of course, the material carrying mechanism 100 may also be applied to an apparatus for manufacturing another workpiece. For example, the material carrying mechanism 100 is applied to an apparatus for manufacturing a circuit board and is configured to store a circuit substrate. The application scenarios of the material carrying mechanism 100 will not be specifically limited here.

Taking the application of the material carrying mechanism 100 provided in the embodiments of the present application to a battery manufacturing apparatus as an example below, and the material carrying mechanism 100 provided in the embodiments of the present application will be described with reference to the accompanying drawings.

Referring to FIGS. 1 to 4, the material carrying mechanism 100 includes a base 110, a tray 120 and an adjustment assembly 130. The tray 120 is configured to supporting a material, and the tray 120 is movably mounted on the base 110. The adjustment assembly 130 is mounted on the base 110. The adjustment assembly 130 includes a first ejection member 131 and a first elastic restoring member 132. The first ejection member 131 includes a first telescopic portion 1311 abutting against the tray 120. The first telescopic portion 1311 can perform a telescopic movement in a first direction to push the tray 120 to move in the first direction, and the first elastic restoring member 132 is connected between the base 110 and the tray 120, so as to provide to the tray 120 a restoring force directed to the first ejection member 131.

The base 110 refers to a component configured to provide a mounting space for the tray 120, the adjustment assembly 130 and other components of the material carrying mechanism 100. The base 110 may be an integrally formed structural member, which may be a plate-like structure, a column-like structure, etc., which will not be specifically limited here. Of course, in other embodiments, the base 110 may also be an assembled member formed by assembling a plurality of components. The base 110 is made of a rigid material, including but not limited to aluminum, copper, iron, steel, plastic, etc., which will not be specifically limited here.

The tray 120 refers to a component configured to support the material. The tray 120 may be an integrally formed structural member, or the tray 120 may also be an assembled member formed by assembling a plurality of components. The tray 120 is made of a rigid material, including but not limited to aluminum, copper, iron, steel, plastic, etc., which will not be specifically limited here.

By the tray 120 being movably mounted on the base 110, it is meant that the tray 120 can move on the base 110 at least in the first direction.

The first ejection member 131 is a component configured to provide a pushing force to the tray 120 such that the tray 120 can move in the first direction. Specifically, the first ejection member 131 provides a pushing force to the tray 120 by extending the first telescopic portion 1311 in the first direction.

Figure 4:
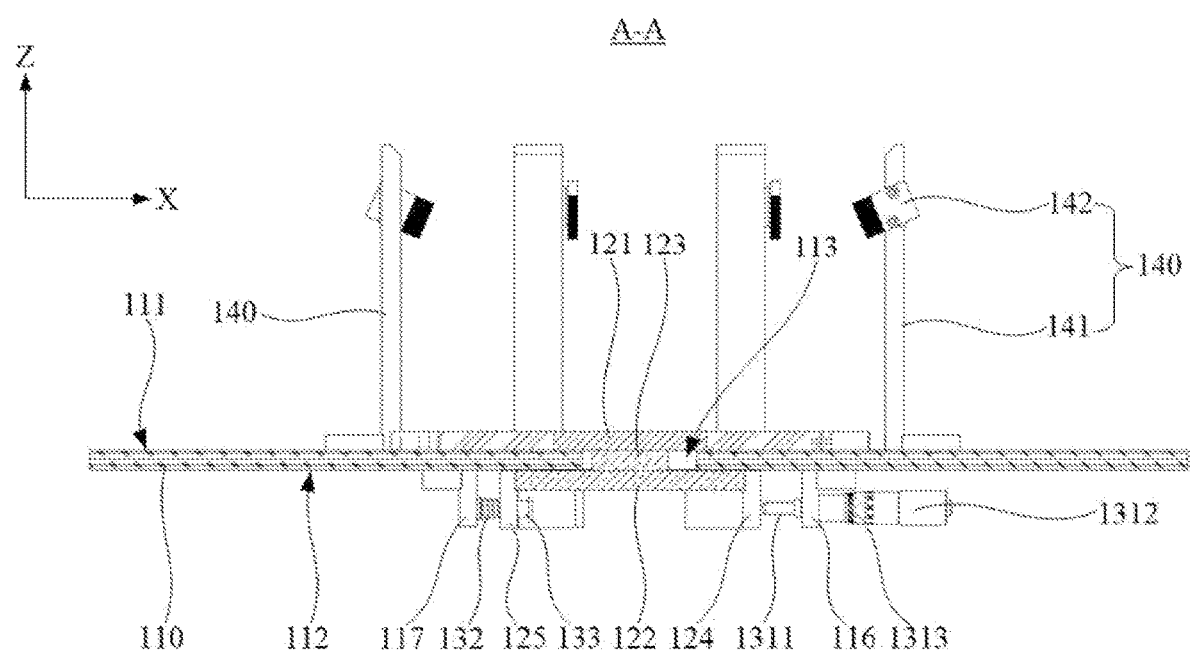
FIG. 4 is a schematic cross-sectional structural diagram of the material carrying mechanism shown in FIG. 3 taken along line A-A.

Specifically, referring to FIG. 4, the base 110 is provided with a first fixing portion 116, the tray 120 is provided with a first ejection portion 124, the first ejection member 131 is fixedly mounted on the first fixing portion 116, and the first telescopic portion 1311 of the first ejection member 131 abuts against the first ejection portion 124.

The first elastic restoring member 132 refers to a component configured to provide a restoring force to the tray 120. The restoring force and the pushing force of the first ejection member 131 acting on the tray 120 are forces opposed to each other, so that the tray 120 can keep abutting against the first telescopic portion 1311 of the first ejection member 131 under the action of the restoring force. Specifically, the first elastic restoring member 132 and the first ejection member 131 may be arranged on two opposite sides of the tray 120 in the first direction, or may be arranged on the same side of the tray 120. When the first elastic restoring member 132 and the first ejection member 131 are arranged on the two opposite sides of the tray 120 in the first direction, the first elastic restoring member 132 abuts against and between the side of the tray 120 facing away from the first ejection member 131 and the base 110, and when the first telescopic portion 1311 of the first ejection member 131 is extended in the first direction, the first elastic restoring member 132 is compressed and deformed to generate a pushing force acting on the tray 120, which pushing force is the restoring force. When the first elastic restoring member 132 and the first ejection member 131 are arranged on the same side of the tray 120, one elastic end of the first elastic restoring member 132 is connected to the base 110 and the other elastic end of the first elastic restoring member 132 is connected to the side of the tray 120 close to the first ejection member 131, and when the first telescopic portion 1311 of the first ejection member 131 is extended in the first direction, the first elastic restoring member 132 is stretched and deformed to generate a pulling force acting on the tray 120, which pulling force is the restoring force. The first elastic restoring member 132 may be one of elastic components such as a spring and an elastic piece, which will not be specifically limited herein.

It can be understood that there may be one or more first ejection members 131, and similarly, there may be one or more first elastic restoring members 132. The first ejection members 131 and the first elastic restoring members 132 may be arranged in one-to-one correspondence, or may not be arranged in one-to-one correspondence. For example, one first elastic restoring member 132 corresponds to a plurality of first ejection members 131. For another example, one first ejection member 131 corresponds to a plurality of first elastic restoring members 132.

The first direction refers to any direction parallel to a support plane of the tray 120 for supporting the material. For example, the first direction is the X direction shown in FIGS. 1 to 4.

In the material carrying mechanism 100 provided in the embodiments of the present application, by abutting the first telescopic portion 1311 of the first ejection member 131 against the tray 120, and by connecting the first elastic restoring member 132 between the base 110 and the tray 120, so as to provide to the tray 120 a restoring force directed to the first ejection member 131, when the first telescopic portion 1311 is extended, the first telescopic portion 1311 pushes the tray 120 to move in the first direction; when the first telescopic portion 1311 is retracted, the tray 120 can move with the first telescopic portion 1311 under the action of the restoring force provided by the first elastic restoring member 132, so that the position of the tray 120 can be adjusted simply by an operator controlling the extended length of the first telescopic portion 1311, so as to realize the adjustment of the storage position of the material, saving time and effort in operation, and effectively improving the operation convenience of the material carrying mechanism 100.

Figure 6:
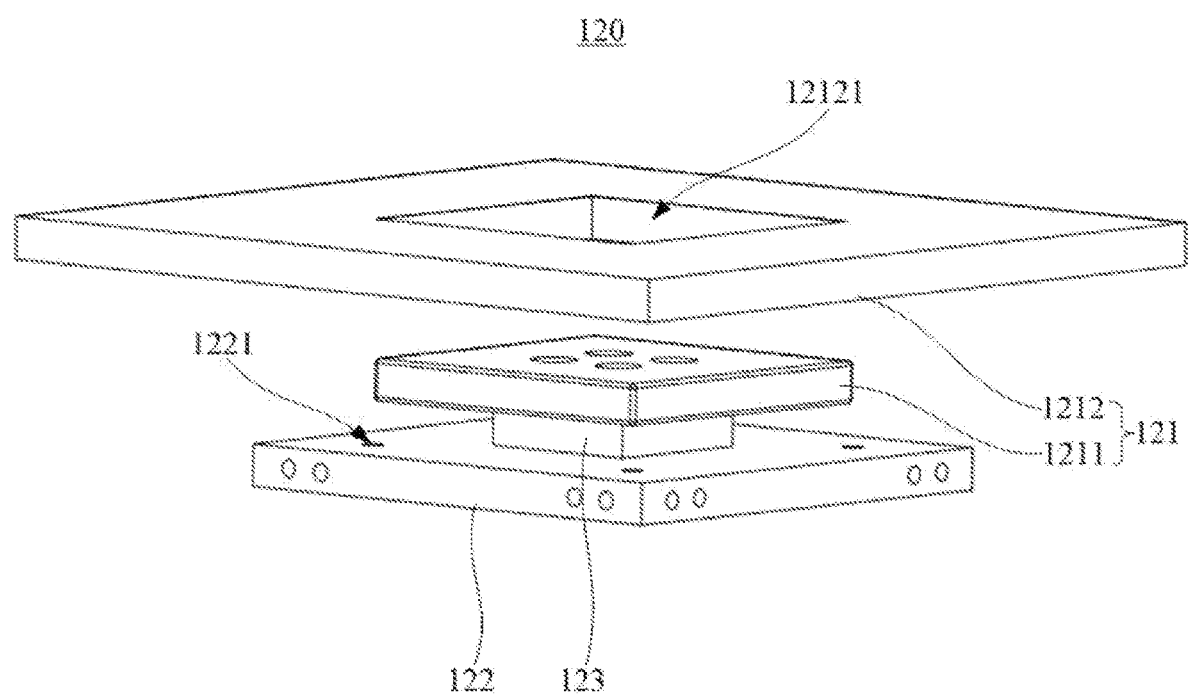
FIG. 6 is an exploded schematic structural diagram of a tray of the material carrying mechanism shown in FIG. 1.

In some embodiments of the present application, referring to FIG. 6, the material carrying mechanism 100 further includes a first fastener (not shown), the tray 120 is provided with a threaded hole 1221, and the first fastener is threadedly connected in the threaded hole 1221 and passes through the threaded hole 1221 so as to abut against the base 110.

The first fastener may be one of threaded components such as a bolt and a screw, and the threaded hole 1221 penetrates the tray 120 in a direction perpendicular to the support plane of the tray 120 (i.e., the Z direction shown in FIGS. 1 and 4). After the first fastener is threadedly connected in the threaded hole 1221, the first fastener may be screwed continuously until the first fastener abuts against the base 110.

With the above technical solution, when the tray 120 is moved to a predetermined position, it is possible to lock the tray 120 on the base 110 simply by the operator tightening the first fastener until the first fastener abuts against the base 110, thereby further improving the operation convenience of the material carrying mechanism 100.

Figure 2:
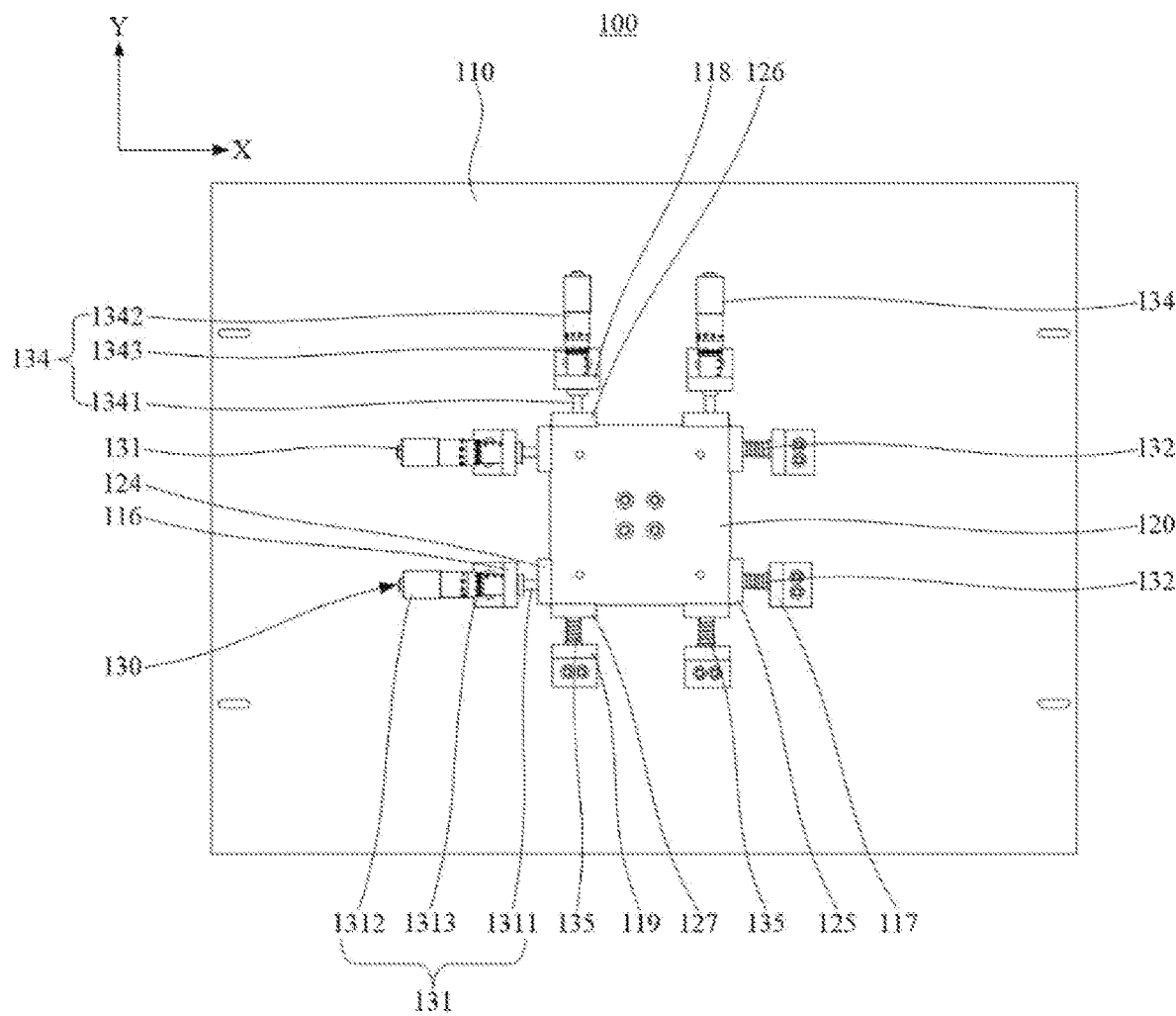
FIG. 2 is a schematic structural diagram, as seen from bottom, of the material carrying mechanism shown FIG. 1.

In some embodiments of the present application, referring to FIGS. 2 and 4, the first ejection member 131 further includes a first threaded sleeve 1312, an outer periphery of the first telescopic portion 1311 has a first external thread, and the first threaded sleeve 1312 is threadedly connected to the first external thread of the first telescopic portion 1311.

It can be understood that a first shaft chamber is formed in the first threaded sleeve 1312, an inner wall of the first shaft chamber is provided with a first internal thread, the outer periphery of the first telescopic portion 1311 refers to the portion of the first telescopic portion 1311 surrounding an axis of the first telescopic portion 1311. That is, the first external thread is arranged around the axis of the first telescopic portion 1311, and the first external thread of the first telescopic portion 1311 cooperates with the first internal thread of the first threaded sleeve 1312 to realize the threaded connection between the first threaded sleeve 1312 and the first telescopic portion 1311.

With the above technical solution, when the first telescopic portion 1311 is screwed, it is possible for the first telescopic portion 1311 to perform a telescopic movement in the first direction under the action of threads, so as to push the tray 120 to move in the first direction.

In some embodiments of the present application, the first ejection member 131 further includes a first pressure cylinder, the first telescopic portion 1311 is a pneumatic rod, and the first telescopic portion 1311 is slidably connected in the first pressure cylinder.

It can be understood that a first pressure chamber is formed in the first pressure cylinder, and the first pressure chamber is configured to receive a pressure transfer medium including but not limited to gas, liquid and the like. The first telescopic portion 1311 is sealed and connected in the first pressure chamber, so as to isolate the first pressure chamber from the external environment of the first ejection member 131.

With the above technical solution, when an internal pressure value of the first pressure cylinder is changed, it is possible for the first telescopic portion 1311 to perform a telescopic movement in the first direction under the action of pressure, so as to push the tray 120 to move in the first direction.

In some embodiments of the present application, referring to FIGS. 2 and 4, the first ejection member 131 is provided with a first scale portion 1313. The first scale portion 1313 is configured to indicate an extended length of the first telescopic portion 1311.

The first scale portion 1313 refers to the portion of the first ejection member 131 that is configured to measure the extended length of the first telescopic portion 1311. When the first telescopic portion 1311 is a screw rod, the first scale portion 1313 may be provided on the first threaded sleeve 1312 and around the axis of the first telescopic portion 1311, or may be provided on the first telescopic portion 1311 and extend in an axial direction of the first telescopic portion 1311. When the first telescopic portion 1311 is a pneumatic rod, the first scale portion 1313 is provided on the first telescopic portion 1311 and extends in the axial direction of the first telescopic portion 1311.

When the first ejection member 131 includes a first threaded sleeve 1312 and the first telescopic portion 1311 of the first ejection member 131 is provided with a first external thread, the first ejection member 131 may be a micrometer screw gage.

With the above technical solution, it is possible for the operator to control the extended length of the first telescopic portion 1311 by observing the scale value of the first scale portion 1313, so as to control a position adjustment amount of the tray 120, thereby effectively improving the position adjustment accuracy of the material by the material carrying mechanism 100.

In some embodiments of the present application, referring to FIG. 4, the adjustment assembly 130 further includes a first guide rod 133 arranged between the base 110 and the tray 120, the first guide rod 133 extends in the first direction, the first elastic restoring member 132 is a spring, and the first elastic restoring member 132 is sleeved on the first guide rod 133.

Specifically, the first elastic restoring member 132 and the first ejection member 131 are arranged on the two opposite sides of the tray 120 in the first direction, the tray 120 is provided with a first pressing portion 125, the base 110 is provided with a second pressing portion 117, one end of the first guide rod 133 is provided with a first position-limit portion, and the other end of the first guide rod 133 is provided with a second position-limit portion.

In some embodiments, the first pressing portion 125 is provided with a second through hole which penetrates the first pressing portion 125 in the first direction, the first guide rod 133 passes through the second through hole, and the first position-limit portion abuts against the second pressing portion 117, the first elastic restoring member 132 is sleeved on the first guide rod 133, one elastic end of the first elastic restoring member 132 abuts against the first position-limit portion, the other elastic end of the first elastic restoring member 132 abuts against the first pressing portion 125, and the second position-limit portion abuts against the side of the first pressing portion 125 facing away from the first elastic restoring member 132.

In some other embodiments, the second pressing portion 117 is provided with a third through hole which penetrates the second pressing portion 117 in the first direction, the first guide rod 133 passes through the third through hole, the first position-limit portion abuts against the side of the second pressing portion 117 facing away from the first pressing portion 125, the first elastic restoring member 132 is sleeved on the first guide rod 133, one elastic end of the first elastic restoring member 132 abuts against the side of the second pressing portion 117 close to the first pressing portion 125, the other elastic end of the first elastic restoring member 132 abuts against the second position-limit portion, and the second position-limit portion abuts against the side of the first pressing portion 125 close to the second pressing portion 117.

In yet some other embodiments, the first pressing portion 125 is provided with a second through hole which penetrates the first pressing portion 125 in the first direction, the second pressing portion 117 is provided with a third through hole which penetrates the second pressing portion 117 in the first direction, the first guide rod 133 passes through the second through hole and the third through hole, the first elastic restoring member 132 is sleeved on the first guide rod 133, one elastic end of the first elastic restoring member 132 abuts against the first pressing portion 125, the other elastic end of the first elastic restoring member 132 abuts against the second pressing portion 117, the first position-limit portion abuts against the side of the second pressing portion 117 facing away from the first elastic restoring member 132, and the second position-limit portion abuts against the side of the first pressing portion 125 facing away from the first elastic restoring member 132.

With the above technical solution, it is possible to prevent the first elastic restoring member 132 from leaving the position between the base 110 and the tray 120, thereby effectively improving the operating reliability of the adjustment assembly 130; and it is also possible to ensure that the first elastic restoring member 132 can stably perform a telescopic movement between the base 110 and the tray 120, thereby effectively improving the operating stability of the adjustment assembly 130.

In some embodiments of the present application, referring to FIG. 2, the adjustment assembly 130 further includes a second ejection member 134 and a second elastic restoring member 135. The second ejection member 134 includes a second telescopic portion 1341 abutting against the tray 120, the second telescopic portion 1341 can perform a telescopic movement in a second direction to push the tray 120 to move in the second direction, and the second elastic restoring member 135 is connected between the base 110 and the tray 120, so as to provide to the tray 120 a restoring force directed to the second ejection member 134. The second direction is not parallel to the first direction.

The second ejection member 134 is a component configured to provide a pushing force to the tray 120 such that the tray 120 can move in the second direction. Specifically, the second ejection member 134 provides a pushing force to the tray 120 by extending the second telescopic portion 1341 in the second direction.

Specifically, the base 110 is provided with a second fixing portion 118, the tray 120 is provided with a second ejection portion 126, the second ejection member 134 is fixedly mounted on the second fixing portion 118, and the second telescopic portion 1341 of the second ejection member 134 abuts against the second ejection portion 126.

The second elastic restoring member 135 refers to a component configured to provide a restoring force to the tray 120. The restoring force and the pushing force of the second ejection member 134 acting on the tray 120 are forces opposed to each other, so that the tray 120 can keep abutting against the second telescopic portion 1341 of the second ejection member 134 under the action of the restoring force. Specifically, the second elastic restoring member 135 and the second ejection member 134 may be arranged on two opposite sides of the tray 120 in the second direction, or may be arranged on the same side of the tray 120. When the second elastic restoring member 135 and the second ejection member 134 are arranged on the two opposite sides of the tray 120 in the second direction, the second elastic restoring member 135 abuts against and between the base 110 and the side of the tray 120 facing away from the second ejection member 134, and when the second telescopic portion 1341 of the second ejection member 134 is extended in the second direction, the second elastic restoring member 135 is compressed and deformed to generate a pushing force acting on the tray 120, which pushing force is the restoring force. When the second elastic restoring member 135 and the second ejection member 134 are arranged on the same side of the tray 120, one elastic end of the second elastic restoring member 135 is connected to the base 110 and the other elastic end of the second elastic restoring member 135 is connected to the side of the tray 120 close to the second ejection member 134, and when the second telescopic portion 1341 of the second ejection member 134 is extended in the second direction, the second elastic restoring member 135 is stretched and deformed to generate a pulling force acting on the tray 120, which pulling force is the restoring force. The second elastic restoring member 135 may be one of elastic components such as a spring and an elastic piece, which will not be specifically limited herein.

It can be understood that there may be one or more second ejection members 134, and similarly, there may be one or more second elastic restoring members 135. The second ejection members 134 and the second elastic restoring members 135 may be arranged in one-to-one correspondence, or may not be arranged in one-to-one correspondence. For example, one second elastic restoring member 135 corresponds to a plurality of second ejection members 134. For another example, one second ejection member 134 corresponds to a plurality of second elastic restoring members 135.

The second direction refers to any direction parallel to the support plane of the tray 120 for supporting the material but not parallel to the first direction. For example, the second direction is the Y direction shown in FIGS. 1 to 3. The second direction may be perpendicular to the first direction, or may not be perpendicular to the first direction.

With the above technical solution, it is possible to adjust the position of the tray 120 in the first direction and in the second direction, thereby effectively increasing the range of position adjustment of the material by the material carrying mechanism 100.

In some embodiments of the present application, referring to FIG. 2, the second ejection member 134 further includes a second threaded sleeve 1342, an outer periphery of the second telescopic portion 1341 has a second external thread, and the second threaded sleeve 1342 is threadedly connected to the second external thread of the second telescopic portion 1341.

It can be understood that a second shaft chamber is formed in the second threaded sleeve 1342, an inner wall of the second shaft chamber is provided with a second internal thread, the outer periphery of the second telescopic portion 1341 refers to the portion of the second telescopic portion 1341 surrounding an axis of the second telescopic portion 1341. That is, the second external thread is arranged around the axis of the second telescopic portion 1341, and the second external thread of the second telescopic portion 1341 cooperates with the second internal thread of the second threaded sleeve 1342 to realize the threaded connection between the second threaded sleeve 1342 and the second telescopic portion 1341.

With the above technical solution, when the second telescopic portion 1341 is screwed, it is possible for the second telescopic portion 1341 to perform a telescopic movement in the second direction under the action of threads, so as to push the tray 120 to move in the second direction.

In some embodiments of the present application, the second ejection member 134 further includes a second pressure cylinder, the second telescopic portion 1341 is a pneumatic rod, and the second telescopic portion 1341 is slidably connected in the second pressure cylinder.

It can be understood that a second pressure chamber is formed in the second pressure cylinder, and the second pressure chamber is configured to receive a pressure transfer medium including but not limited to gas, liquid and the like. The second telescopic portion 1341 is sealed and connected in the second pressure chamber, so as to isolate the second pressure chamber from the external environment of the second ejection member 134.

With the above technical solution, when an internal pressure value of the second pressure cylinder is changed, it is possible for the second telescopic portion 1341 to perform a telescopic movement in the second direction under the action of pressure, so as to push the tray 120 to move in the second direction.

In some embodiments of the present application, referring to FIG. 2, the second ejection member 134 is provided with a second scale portion 1343. The second scale portion 1343 is configured to indicate an extended length of the second telescopic portion 1341.

The second scale portion 1343 refers to the portion of the second ejection member 134 that is configured to measure the extended length of the second telescopic portion 1341. When the second telescopic portion 1341 is a screw rod, the second scale portion 1343 may be provided on the second threaded sleeve 1342 and around the axis of the second telescopic portion 1341, or may be provided on the second telescopic portion 1341 and extend in an axial direction of the second telescopic portion 1341. When the second telescopic portion 1341 is a pneumatic rod, the second scale portion 1343 is provided on the second telescopic portion 1341 and extends in the axial direction of the second telescopic portion 1341.

When the second ejection member 134 includes a second threaded sleeve 1342 and the second telescopic portion 1341 of the second ejection member 134 is provided with a second external thread, the second ejection member 134 may be a micrometer screw gage.

With the above technical solution, it is possible for the operator to control the extended length of the second telescopic portion 1341 by observing the scale value of the second scale portion 1343, so as to control a position adjustment amount of the tray 120, thereby effectively improving the position adjustment accuracy of the material by the material carrying mechanism 100.

In some embodiments of the present application, the adjustment assembly 130 further includes a second guide rod arranged between the base 110 and the tray 120, the second guide rod extends in the second direction, the second elastic restoring member 135 is a spring, and the second elastic restoring member 135 is sleeved on the second guide rod.

Specifically, referring to FIG. 2, the second elastic restoring member 135 and the second ejection member 134 are arranged on the two opposite sides of the tray 120 in the second direction, the tray 120 is provided with a third pressing portion 127, the base 110 is provided with a fourth pressing portion 119, one end of the second guide rod is provided with a third position-limit portion, and the other end of the second guide rod is provided with a fourth position-limit portion.

In some embodiments, the third pressing portion 127 is provided with a fourth through hole which penetrates the third pressing portion 127 in the second direction, the second guide rod passes through the fourth through hole, the third position-limit portion abuts against the fourth pressing portion 119, the second elastic restoring member 135 is sleeved on the second guide rod, one elastic end of the second elastic restoring member 135 abuts against the third position-limit portion, the other elastic end of the second elastic restoring member 135 abuts against the third pressing portion 127, and the fourth position-limit portion abuts against the side of the third pressing portion 127 facing away from the second elastic restoring member 135.

In some other embodiments, the fourth pressing portion 119 is provided with a fifth through hole which penetrates the fourth pressing portion 119 in the second direction, the second guide rod passes through the fifth through hole, the third position-limit portion abuts against the side of the fourth pressing portion 119 facing away from the third pressing portion 127, the second elastic restoring member 135 is sleeved on the second guide rod, one elastic end of the second elastic restoring member 135 abuts against the side of the fourth pressing portion 119 close to the third pressing portion 127, the other elastic end of the second elastic restoring member 135 abuts against the fourth position-limit portion, and the fourth position-limit portion abuts against the side of the third pressing portion 127 close to the fourth pressing portion 119.

In yet some other embodiments, the third pressing portion 127 is provided with a fourth through hole which penetrates the third pressing portion 127 in the second direction, the fourth pressing portion 119 is provided with a fifth through hole which penetrates the fourth pressing portion 119 in the second direction, the second guide rod passes through the fourth through hole and the fifth through hole, the second elastic restoring member 135 is sleeved on the second guide rod, one elastic end of the second elastic restoring member 135 abuts against the third pressing portion 127, the other elastic end of the second elastic restoring member 135 abuts against the fourth pressing portion 119, the third position-limit portion abuts against the side of the fourth pressing portion 119 facing away from the second elastic restoring member 135, and the fourth position-limit portion abuts against the side of the third pressing portion 127 facing away from the second elastic restoring member 135.

With the above technical solution, it is possible to prevent the second elastic restoring member 135 from leaving the position between the base 110 and the tray 120, thereby effectively improving the operating reliability of the adjustment assembly 130; and it is also possible to ensure that the second elastic restoring member 135 can stably perform a telescopic movement between the base 110 and the tray 120, thereby effectively improving the operating stability of the adjustment assembly 130.

In some embodiments of the present application, referring to FIGS. 4 and 6, the base 110 has a first surface 111 and a second surface 112 arranged opposite to each other, and the base 110 is provided with a first through hole 113 penetrating the first surface 111 and the second surface 112. The tray 120 includes a support portion 121, an adjustment portion 122 and a connecting portion 123. The support portion 121 is arranged on the first surface 111 and is configured to support the material. The adjustment portion 122 is arranged on the second surface 112. The connecting portion 123 passes through the first through hole 113 and is connected between the support portion 121 and the adjustment portion 122, and the connecting portion 123 can move in the first direction in the first through hole 113. The adjustment assembly 130 is mounted on the second surface 112, and the first telescopic portion 1311 abuts against the adjustment portion 122.

The first surface 111 and the second surface 112 refer to two surfaces of the base 110 arranged opposite to each other in the direction perpendicular to the support plane of the support portion 121 (i.e., in the Z direction shown in FIG. 4).

The first through hole 113 penetrates the first surface 111 and the second surface 112 in the direction perpendicular to the support plane of the support portion 121 (i.e., in the Z direction shown in FIG. 4). In some embodiments, when the adjustment assembly 130 only includes a first ejection member 131 and a first elastic restoring member 132, the first through hole 113 may be of a strip-shaped structure extending in the first direction, and the connecting portion 123 can move in the first direction in the first through hole 113. In some other embodiments, when the adjustment assembly 130 includes a first ejection member 131, a first elastic restoring member 132, a second ejection member 134 and a second elastic restoring member 135, the first through hole 113 may be of a circular structure or a square structure, and the inner diameter of the first through hole 113 is larger than the outer diameter of the connecting portion 123, such that the connecting portion 123 can move in the first direction and in the second direction in the first through hole 113.

The support portion 121 refers to a component of the tray 120 that is configured to support the material, and the support portion 121 may be an integrally formed structural member, or may be an assembled member formed by assembling a plurality of components. The support portion 121 is made of a rigid material, including but not limited to aluminum, copper, iron, steel, plastic, etc., which will not be specifically limited here.

The adjustment portion 122 refers to a component of the tray 120 that is configured to cooperate with the adjustment assembly 130 to adjust the position of the support portion 121. The adjustment portion 122 is made of a rigid material, including but not limited to aluminum, copper, iron, steel, plastic, etc., which will not be specifically limited here.

The connecting portion 123 refers to a component of the tray 120 that is configured to connect the support portion 121 to the adjustment portion 122. The connecting portion 123 is made of a rigid material, including but not limited to aluminum, copper, iron, steel, plastic, etc., which will not be specifically limited here. The connection methods of the connecting portion 123 with the support portion 121 and the adjustment portion 122 include but not limited to fastening connection, welding, bonding, etc., which will not be specifically limited here.

With the technical solution, the structure of the material carrying mechanism 100 is effectively optimized, so as to avoid interference between the adjustment assembly 130 and the material placed on the support portion 121 or other components arranged on the first surface 111 of the base 110.

In some embodiments of the present application, referring to FIG. 6, the support portion 121 includes a first plate body 1211 and a second plate body 1212. The first plate body 1211 is connected to the connecting portion 123, the second plate body 1212 is configured to support the material, and the second plate body 1212 is detachably connected to the first plate body 1211.

The detachable connection methods of the first plate body 1211 with the second plate body 1212 include but are not limited to embedding, fastening connection, snap-fit connection, etc., which will not be specifically limited here.

With the above technical solution, it is possible for the operator to replace the second plate body 1212 according to the size of the material, so that the material carrying mechanism 100 can be applied to materials of different sizes, thereby effectively improving the versatility of the material carrying mechanism 100.

In some embodiments of the present application, referring to FIG. 6, the second plate body 1212 has a mounting cavity 12121. The first plate body 1211 is embedded in the mounting cavity 12121.

It can be understood that the mounting cavity 12121 may penetrate the second plate body 1212, or may not penetrate the second plate body 1212, and an inner peripheral contour of the mounting cavity 12121 is adapted to an outer peripheral contour of the first plate body 1211, in other words, an inner peripheral wall of the mounting cavity 12121 is in close contact with an outer peripheral wall of the first plate body 1211. Of course, due to manufacturing tolerances, it is also possible that there is a certain gap between the inner peripheral wall of the mounting cavity 12121 and the outer peripheral wall of the first plate body 1211.

With the above technical solution, it is possible to replace the second plate body 1212 quickly, thereby further improving the operation convenience of the material carrying mechanism 100.

In some other embodiments of the present application, the support portion 121 is detachably connected to the connecting portion 123.

The detachable connection methods of the support portion 121 with the connecting portion 123 include but are not limited to embedding, fastening connection, snap-fit connection, etc., which will not be specifically limited here.

With the above technical solution, it is possible for the operator to replace the support portion 121 according to the size of the material, so that the material carrying mechanism 100 can be applied to materials of different sizes, thereby effectively improving the versatility of the material carrying mechanism 100.

Figure 7:
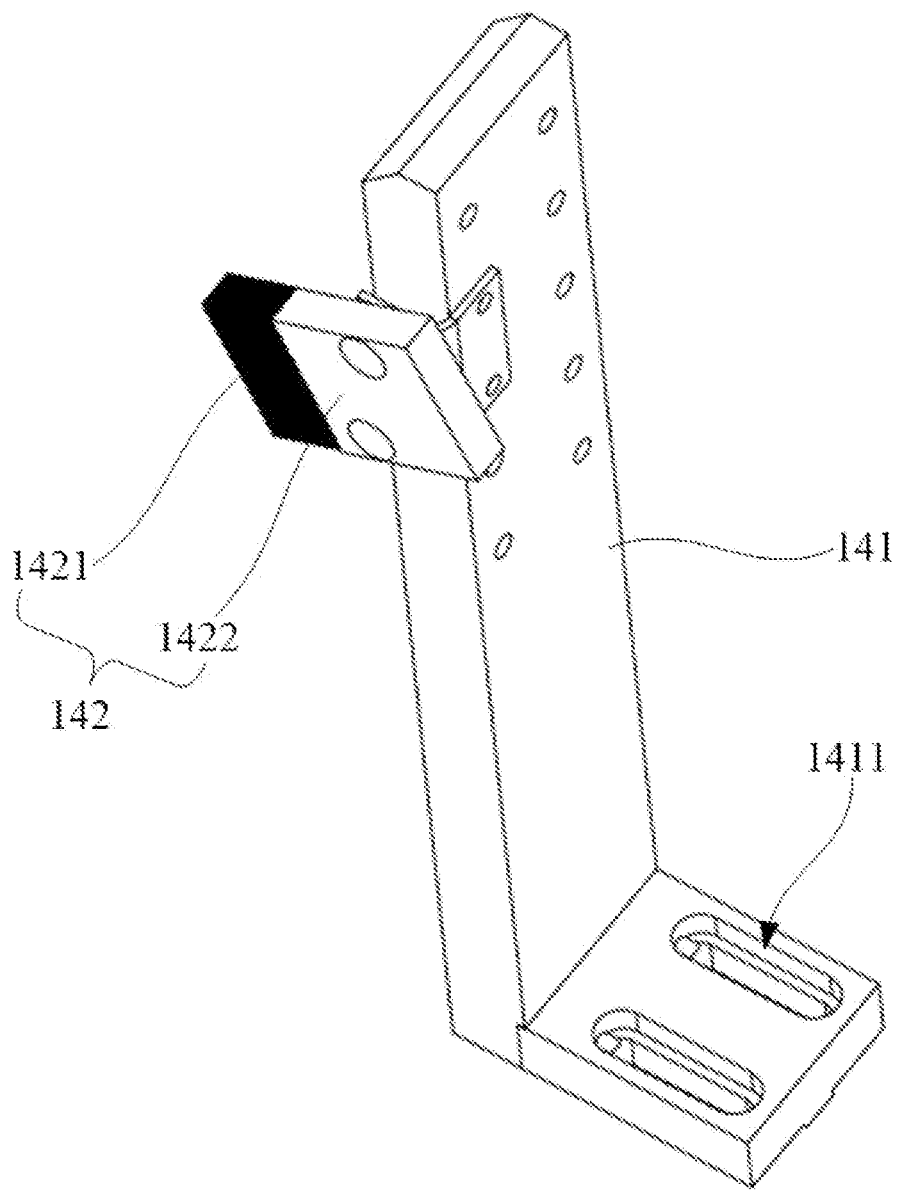
FIG. 7 is a schematic structural diagram of a separation assembly of the material carrying mechanism shown in FIG. 1.

In some embodiments of the present application, referring to FIGS. 4 and 7, the material carrying mechanism 100 further includes a separation assembly 140. The separation assembly 140 includes a mounting seat 141 mounted on the base 110 and a separation member 142 mounted on the mounting seat 141. The separation member 142 is in contact with an edge of the material.

The mounting seat 141 refers to a component of the separation assembly 140 that is configured to provide a mounting space for the separation member 142 and other components in the separation assembly 140. The mounting seat 141 may be an integrally formed structural member, which may be a plate-like structure, a column-like structure, etc., which will not be specifically limited here. Of course, in other embodiments, the mounting seat 141 may also be an assembled member formed by assembling a plurality of components. The mounting seat 141 is made of a rigid material, including but not limited to aluminum, copper, iron, steel, plastic, etc., which will not be specifically limited here.

The separation member 142 refers to a component of the separation assembly 140 that is configured to be in contact with the edge of the material to separate the materials attached to each other. The separation member 142 may be movably connected to the mounting seat 141, or may be fixedly connected to the mounting seat 141. In this embodiment, the separation member 142 is movably connected to the mounting seat 141. Specifically, the separation member 142 is rotatably mounted on the mounting seat 141, such that the separation member 142 can swing back and forth in a stacking direction of materials.

The materials are generally placed on the tray 120 in a stacked manner. During the pick-up process, the pick-up mechanism picks the material at the top of the material stack. At this time, the picked material may be attached to one or more materials under the picked material, but under the effect of contact between the separation member 142 and the edge of the material, the separation member 142 can scrape the one or more materials under the taken material, so that the picked material is separated from the one or more materials under the picked material.

With the above technical solution, it is possible to separate, during a pick-up process, materials that are attached to each other, so as to avoid the situation that a plurality of materials are picked up in one pick-up operation, so as to ensure that the pick-up operation can be carried out stably, thereby effectively improving the production efficiency.

Figure 3:
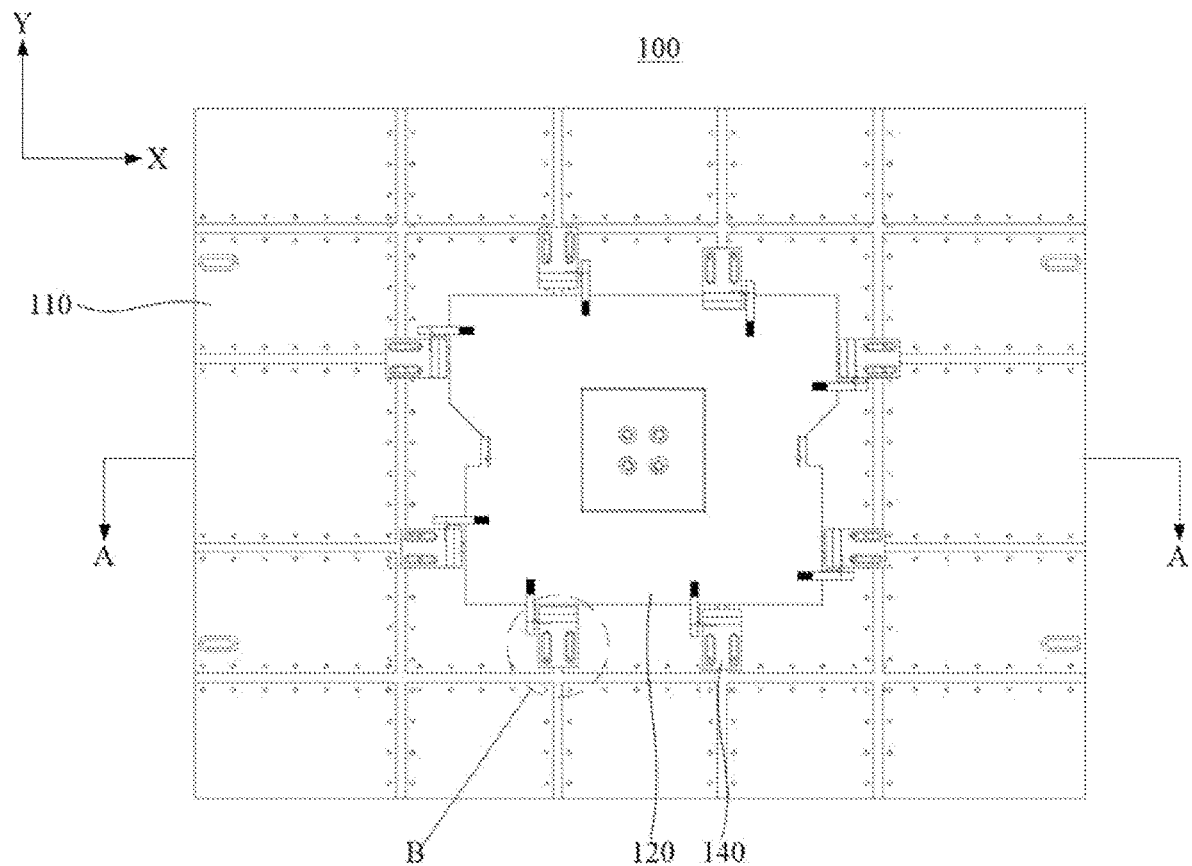
FIG. 3 is a schematic structural diagram, as seen from top, of the material carrying mechanism shown FIG. 1.
Figure 5:
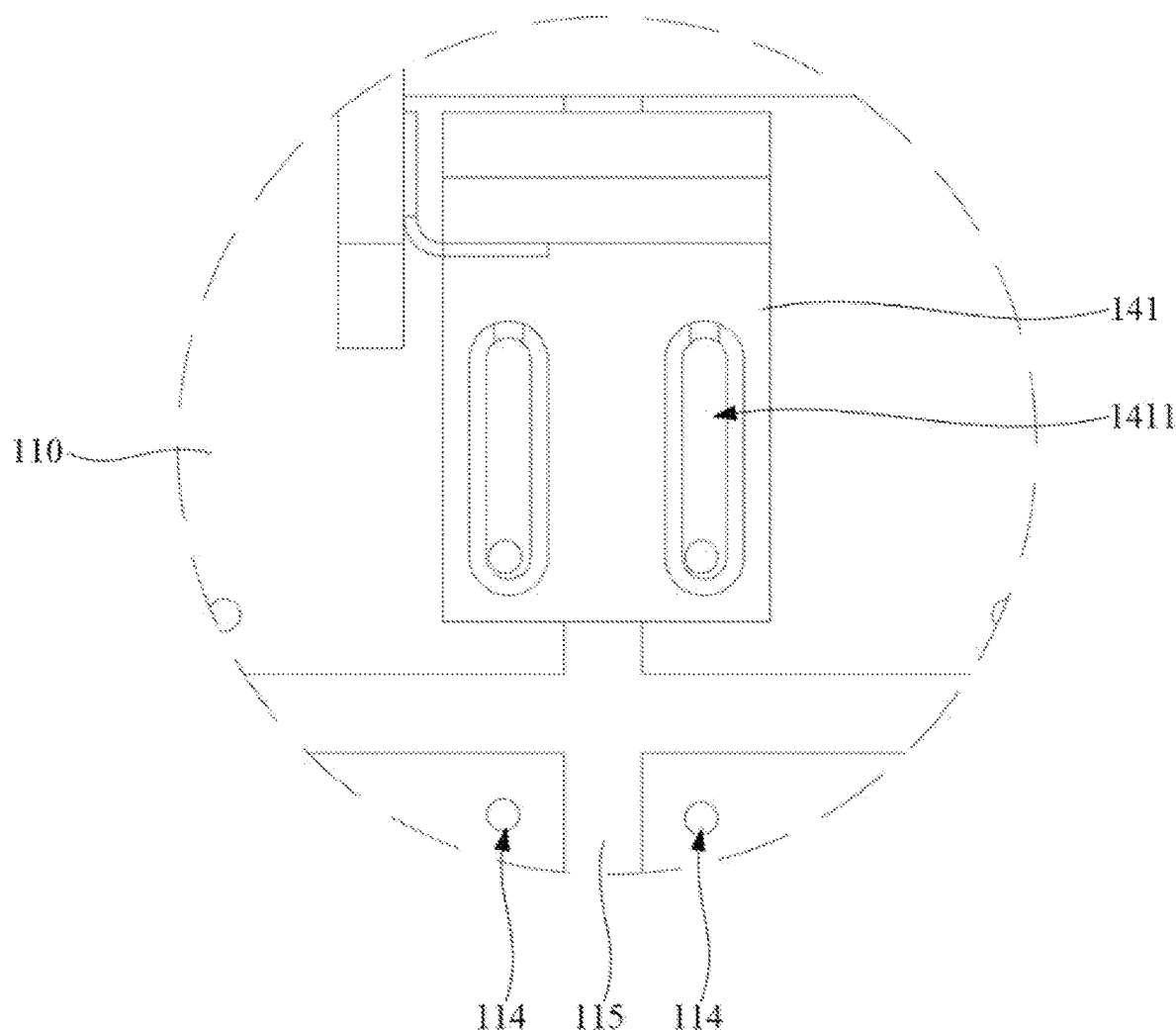
FIG. 5 is an enlarged schematic structural diagram of portion B of the material carrying mechanism shown in FIG. 3.

In some embodiments of the present application, referring to FIGS. 3 and 5, the base 110 is provided with a plurality of positioning holes 114. The plurality of positioning holes 114 are distributed in sequence from an edge of the tray 120 in a direction away from the tray 120, and the mounting seat 141 is connected to any one or more of the positioning holes 114.

The plurality of positioning holes 114 may be distributed in a multi-row structure, and the plurality of rows of positioning holes 114 all extend from the edge of the tray 120 in the direction away from the tray 120. For example, the plurality of positioning holes 114 are arranged in two rows, one side of the mounting seat 141 is connected to any one or more positioning holes 114 of one row of positioning holes 114, and the other side of the mounting seat 141 is connected to the positioning hole(s) 114 of the other row of positioning holes 114 that is/are located in the same column as the aforementioned positioning hole(s) 114.

With the above technical solution, it is possible for the operator to adjust the position of the mounting seat 141 according to the size of the material, so that the material carrying mechanism 100 can be applied to materials of different sizes, thereby effectively improving the versatility of the material carrying mechanism 100.

In some embodiments of the present application, referring to FIGS. 3 and 5, the base 110 is provided with a guide portion 115. The guide portion 115 has an extending direction parallel to the distribution direction of the plurality of positioning holes 114, and the mounting seat 141 is slidably mounted to the guide portion 115.

The guide portion 115 refers to the portion of the base 110 that guides the movement of the mounting seat 141. The guide portion 115 may be a slide groove provided on the base 110, or may be a sliding rail provided on the base 110. Specifically, the mounting seat 141 is provided with a slider slidably cooperating with the guide portion 115.

With the above technical solution, it is possible for the operator to move the mounting seat 141 to a predetermined position in the extending direction of the guide portion 115, facilitating the position adjustment operation of the mounting seat 141, thereby further improving the operation convenience of the material carrying mechanism 100.

In some embodiments of the present application, referring to FIGS. 3, 5 and 7, the separation assembly 140 further includes a second fastener (not shown), the mounting seat 141 is provided with a strip-shaped hole 1411 extending in the distribution direction of the plurality of positioning holes 114, and the second fastener passes through the strip-shaped hole 1411 and is connected in the positioning hole 114.

The second fastener may be one of fastening components such as a bolt, a screw, an indexing pin, a and fastening pin. For example, when the second fastener is a threaded component such as a bolt or a screw, a hole wall of the positioning hole 114 is provided with an internal thread, and the second fastener is threadedly connected in the positioning hole 114. For another example, when the second fastener is a pin component such as an indexing pin and a fastening pin, the positioning hole 114 is a pin hole, and the second fastener is inserted into the positioning hole 114.

The number of strip-shaped holes 1411 may be determined according to actual application requirements, and the number of second fasteners is equal to the number of strip-shaped holes 1411. For example, the strip-shaped holes 1411 are respectively provided on two opposite sides of the mounting seat 141; correspondingly, the plurality of positioning holes 114 are arranged in two rows, one second fastener is connected, after passing through the strip-shaped hole 1411 on one side of the mounting seat 141, to the positioning hole 114 of one row of positioning holes 114, and the other second fastener is connected, after passing through the strip-shaped hole 1411 on the other side of the mounting seat 141, to the positioning hole 114 of the other row of positioning holes 114 that is in the same arrangement position as the aforementioned positioning hole 114.

With the above technical solution, after the second fastener is connected to the positioning hole 114, it is possible to fine-tune the position of the mounting seat 141 still in the extending direction of the strip-shaped hole 1411, and then to tighten the second fastener so as to lock the mounting seat 141 on the base 110, thereby effectively improving the position adjustment accuracy of the mounting seat 141.

In some embodiments of the present application, referring to FIG. 7, the separation member 142 includes a flexible portion 1421. The flexible portion 1421 is in contact with the edge of the material.

The flexible portion 1421 may be a brush, or may be a block made of a flexible material. The flexible material may be combination of one or more of the following materials: silica gel, rubber, foam, etc., which will not be specifically limited here.

Specifically, the separation member 142 may further include a mounting portion 1422, the flexible portion 1421 is connected to the mounting portion 1422, and the mounting portion 1422 is connected to the mounting seat 141.

With the above technical solution, the separation member 142 can be in flexible contact with the material, so as to buffer a contact force between the separation member 142 and the material, thereby preventing the separation member 142 from damaging the material.

In some embodiments of the present application, referring to FIGS. 1 and 3, there are a plurality of separation assemblies 140. The plurality of separation assemblies 140 are distributed at intervals along an outer periphery of the tray 120.

The distribution configuration of the plurality of separation assemblies 140 may be determined according to the shape of the material. For example, the material is of a square structure, and at least one separation assembly 140 may be correspondingly arranged at each edge of the material. For example, the material is of a circular structure, and a plurality of separation assemblies 140 are evenly distributed along the perimeter of the material.

With the above technical solution, it is possible to ensure that the materials attached to each other are separated during the pick-up process, so as to avoid the situation that a plurality of materials are picked up in one pick-up operation, and more effectively ensure that the pick-up operation can be carried out stably, thereby further improving the production efficiency.

In some embodiments of the present application, referring to FIG. 1, the tray 120 is provided with a positioning portion 128. The positioning portion 128 is configured to limit the position of the material.

The positioning portion 128 refers to a component of the tray 120 that is configured to limit the position of the material. Specifically, the positioning portion 128 extends in the direction perpendicular to the support plane of the tray 120 (i.e., in the Z direction shown in FIG. 1). In some embodiments, the positioning portion 128 may be a positioning pin, which passes through the material to limit the position of the material. In some other embodiments, the positioning portion 128 may also be a positioning plate, which is in close contact with the edge of the material to limit the position of the material. There are a plurality of positioning portions 128. For example, there are two positioning portions 128, the two positioning portions 128 are arranged opposite each other and spaced apart from each other, and the material is placed between the two positioning portions 128.

With the above technical solution, it is possible to avoid the displacement of the material, thereby ensuring that the position of the material is adapted to the picking position of the feeding device, and effectively improving the operating reliability of the material carrying mechanism 100.

In a second aspect, the embodiments of the present application also provide a feeding device, including a pick-up mechanism and a material carrying mechanism 100 of any one of the above embodiments, wherein the pick-up mechanism is configured to pick up a material placed on the tray 120.

The pick-up mechanism refers to a mechanism configured to pick up the material placed on the tray 120. The type of the pick-up mechanism may be determined according to the type of material placed on the tray 120. For example, when a material with a small thickness and mass, such as an insulating sheet and an electrode sheet, is to be placed on the tray 120, the pick-up mechanism may be a suction cup mechanism. The suction cup mechanism includes at least a suction cup, an air suction pipeline and an air suction pump. The suction cup is in communication with the air suction pump through the air suction pipeline, and the suction cup is attached to the surface of the material to pick the material. For another example, when a material with a relatively large thickness and mass, such as a partition plate and an end cover, is to be placed on the tray 120, the pick-up mechanism may be a manipulator, and the material is gripped by the manipulator to pick the material.

In some embodiments, the feeding device further includes a frame, on which the base 110 of the material carrying mechanism 100 and the pick-up mechanism are both mounted.

Since the feeding device provided in the embodiments of the present application uses the material carrying mechanism 100 of any of the above embodiments, it is possible to adjust the storage position of the material more conveniently such that the storage position of the material is adapted to the picking position of the pick-up mechanism, thereby effectively improving the production efficiency.

In a third aspect, the embodiments of the present application also provide a battery manufacturing apparatus, including the feeding device described above.

The battery manufacturing apparatus is configured to manufacture a battery. The battery may be a battery cell, that is, the smallest electric energy storage unit formed by winding or stacking a positive electrode sheet, a negative electrode sheet and a separator; or may be a battery module, that is, an electric energy storage device formed by connecting and arranging a plurality of battery cells in series, parallel or series-parallel connection; or may be a battery pack, that is, an electric energy storage device formed by connecting and arranging a plurality of battery cells or a plurality of battery modules in series, parallel or series-parallel connection.

In some embodiments, the battery manufacturing apparatus further includes a manufacturing device, which includes but is not limited to a film application device, a coating apparatus, a welding device, etc., and the type of the manufacturing device may be determined according to the type of the material placed on the tray 120. For example, when an electrode sheet is to be placed on the tray 120, the manufacturing device may be a coating apparatus, which is configured to coat an active material on a surface of the electrode sheet. For another example, when an end cover is to be placed on the tray 120, the manufacturing device may be a welding device configured to weld the end cover to a case of the battery.

Since the battery manufacturing apparatus provided in the embodiments of the present application uses the feeding device of any of the above embodiments, it is possible to adjust the storage position of the material more conveniently such that the storage position of the material is adapted to the picking position of the pick-up mechanism, thereby effectively improving the production efficiency.

The above description merely relates to some embodiments of the present application, and is not intended to limit the present application. Any modifications, equivalent replacements, improvements, etc. made within the spirit and principles of the present application should be included within the scope of protection of the present application.

What is claimed is:

1. A material carrying mechanism, comprising:
   a base;
   a tray configured to support a material, the tray being movably mounted on the base; and
   an adjustment assembly mounted on the base, the adjustment assembly comprising a first ejection member and a first elastic restoring member, wherein the first ejection member comprises a first telescopic portion abutting against the tray, the first telescopic portion is capable of performing a telescopic movement in a first direction to push the tray to move in the first direction, and the first elastic restoring member is connected between the base and the tray, so as to provide to the tray a restoring force directed to the first ejection member.

2. The material carrying mechanism according to claim 1, further comprising:
   a first fastener;
   wherein the tray is provided with a threaded hole, and the first fastener is threadedly connected in the threaded hole and passes through the threaded hole so as to abut against the base.

3. The material carrying mechanism according to claim 1, wherein the first ejection member further comprises a first threaded sleeve, an outer periphery of the first telescopic portion has a first external thread, and the first threaded sleeve is threadedly connected to the first external thread of the first telescopic portion.

4. The material carrying mechanism according to claim 1, wherein the first ejection member further comprises a first pressure cylinder, the first telescopic portion is a pneumatic rod, and the first telescopic portion is slidably connected in the first pressure cylinder.

5. The material carrying mechanism according to claim 1, wherein the first ejection member is provided with a first scale portion configured to indicate an extended length of the first telescopic portion.

6. The material carrying mechanism according to claim 1, wherein the adjustment assembly further comprises a first guide rod arranged between the base and the tray, the first guide rod extends in the first direction, the first elastic restoring member is a spring, and the first elastic restoring member is sleeved on the first guide rod.

7. The material carrying mechanism according to claim 1, wherein the adjustment assembly further comprises a second ejection member and a second elastic restoring member, wherein the second ejection member comprises a second telescopic portion abutting against the tray, the second telescopic portion is capable of performing a telescopic movement in a second direction to push the tray to move in the second direction, and the second elastic restoring member is connected between the base and the tray, so as to provide to the tray a restoring force directed to the second ejection member, the second direction being not parallel to the first direction.

8. The material carrying mechanism according to claim 7, wherein the second ejection member further comprises a second threaded sleeve, an outer periphery of the second telescopic portion has a second external thread, and the second threaded sleeve is threadedly connected to the second external thread of the second telescopic portion.

9. The material carrying mechanism according to claim 7, wherein the second ejection member further comprises a second pressure cylinder, the second telescopic portion is a pneumatic rod, and the second telescopic portion is slidably connected in the second pressure cylinder.

10. The material carrying mechanism according to claim 7, wherein the second ejection member is provided with a second scale portion configured to indicate an extended length of the second telescopic portion.

11. The material carrying mechanism according to claim 7, wherein the adjustment assembly further comprises a second guide rod arranged between the base and the tray, the second guide rod extends in the second direction, the second elastic restoring member is a spring, and the second elastic restoring member is sleeved on the second guide rod.

12. The material carrying mechanism according to claim 1, wherein:
the base has a first surface and a second surface arranged opposite to each other, and the base is provided with a first through hole penetrating the first surface and the second surface;
the tray comprises a support portion, an adjustment portion and a connecting portion, wherein the support portion is arranged on the first surface and is configured to support the material, the adjustment portion is arranged on the second surface, the connecting portion passes through the first through hole and is connected between the support portion and the adjustment portion, and the connecting portion is movable in the first direction in the first through hole; and
the adjustment assembly is mounted on the second surface, and the first telescopic portion abuts against the adjustment portion.

13. The material carrying mechanism according to claim 12, wherein:
the support portion comprises a first plate body and a second plate body, wherein the first plate body is connected to the connecting portion, the second plate body is configured to support the material, and the second plate body is detachably connected to the first plate body;
optionally the second plate body has a mounting cavity in which the first plate body is embedded; and/or
the support portion is detachably connected to the connecting portion.

14. The material carrying mechanism according to claim 1, further comprising:
a separation assembly, the separation assembly comprising a mounting seat mounted on the base and a separation member mounted on the mounting seat, the separation member being in contact with an edge of the material.

15. The material carrying mechanism according to claim 14, wherein the base is provided with a plurality of positioning holes distributed in sequence from an edge of the tray in a direction away from the tray, and the mounting seat is connected to one or more of the positioning holes.

16. The material carrying mechanism according to claim 15, wherein:
the base is provided with a guide portion having an extending direction parallel to a distribution direction of the plurality of positioning holes, and the mounting seat is slidably mounted to the guide portion; and/or
the separation assembly further comprises a second fastener, the mounting seat is provided with a strip-shaped hole extending in the distribution direction of the plurality of positioning holes, and the second fastener passes through the strip-shaped hole and is connected in the positioning hole.

17. The material carrying mechanism according to claim 14, wherein:
the separation member comprises a flexible portion which is in contact with the edge of the material; and/or
the separation assembly is one of a plurality of separation assemblies distributed at intervals along an outer periphery of the tray.

18. The material carrying mechanism according to claim 1, wherein the tray is provided with a positioning portion configured to limit the position of the material.

* * * * *